United States Patent
Lin

(10) Patent No.: US 7,353,439 B2
(45) Date of Patent: Apr. 1, 2008

(54) CROSS-PLATFORM TEST ENVIRONMENT AUTOMATIC SETUP METHOD AND SYSTEM

(75) Inventor: Ting-Chieh Lin, Taipei (TW)

(73) Assignee: Inventec Corporation, Taipei (TW)

( * ) Notice: Subject to any disclaimer, the term of this patent is extended or adjusted under 35 U.S.C. 154(b) by 815 days.

(21) Appl. No.: 10/832,643

(22) Filed: Apr. 26, 2004

(65) Prior Publication Data

US 2005/0240841 A1  Oct. 27, 2005

(51) Int. Cl.
*G01R 31/28* (2006.01)
*G06F 11/00* (2006.01)

(52) U.S. Cl. .......................... 714/724; 714/46

(58) Field of Classification Search ................ 714/724
See application file for complete search history.

(56) References Cited

U.S. PATENT DOCUMENTS

2005/0138473 A1* 6/2005 Mathew et al. ............... 714/27

* cited by examiner

Primary Examiner—Shelly Chase
Assistant Examiner—John J. Tabone, Jr.
(74) Attorney, Agent, or Firm—Foley & Lardner LLP

(57) ABSTRACT

A cross-platform test environment automatic setup method and system is proposed, which is designed for use on an information platform that is running on a particular kind of operating system, for the purpose of providing the information platform with a cross-platform test environment automatic setup capability that allows a particular test procedure to be capable of being conducted under the particular kind of operating system on the information platform. The proposed cross-platform test environment automatic setup method and system is advantageous to use than prior art in that it allows the same test procedure to have a cross-platform capability that allows the same test procedure to be conducted under different operating systems without requiring test engineers to manually configure the required test environment in different operating systems, which allows the testing to be more easily and quickly and thus more efficiently than prior art.

14 Claims, 2 Drawing Sheets

|  | Test Procedure 1 | Test Procedure 2 |
|---|---|---|
| Red Hat 7.3 | Parameter Set for Test Procedure 1 under Red Hat 7.3 | Parameter Set for Test Procedure 2 under Red Hat 7.3 |
| Red Hat 8.0 | Parameter Set for Test Procedure 1 under Red Hat 8.0 | Parameter Set for Test Procedure 2 under Red Hat 8.0 |
| Red Hat 9.0 | Parameter Set for Test Procedure 1 under Red Hat 9.0 | Parameter Set for Test Procedure 2 under Red Hat 9.0 |
| SuSE SLES 7 | Parameter Set for Test Procedure 1 under SuSE SLES 7 | Parameter Set for Test Procedure 2 under SuSE SLES 7 |
| United Linux 1.0 | Parameter Set for Test Procedure 1 under United Linux 1.0 | Parameter Set for Test Procedure 2 under United Linux 1.0 |
| Red Hat AS 2.1 | Parameter Set for Test Procedure 1 under Red Hat AS 2.1 | Parameter Set for Test Procedure 2 under Red Hat AS 2.1 |
| Red Hat ES 2.1 | Parameter Set for Test Procedure 1 under Red Hat ES 2.1 | Parameter Set for Test Procedure 2 under Red Hat ES 2.1 |

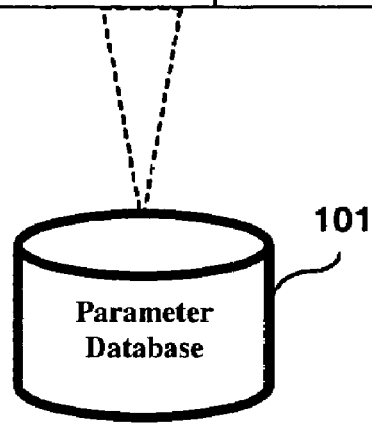

101
Parameter Database

FIG. 2

CROSS-PLATFORM TEST ENVIRONMENT AUTOMATIC SETUP METHOD AND SYSTEM

BACKGROUND OF THE INVENTION

1. Field of the Invention

This invention relates to information technology (IT), and more particularly, to a cross-platform test environment automatic setup method and system for use on an information platform such as a blade server, a 1U (single-unit) server, a network-linked workstation, a desktop computer, a notebook computer, a tablet computer, or the like, that is running on a particular kind of operating system, for the purpose of providing the information platform with a cross-platform test environment automatic setup capability that allows a particular test procedure to be capable of being conducted under the particular kind of operating system on the information platform.

2. Description of Related Art

An information platform, such as a blade server, a 1U (single-unit) server, a network-linked workstation, a desktop computer, a notebook computer, a tablet computer, or the like, typically requires a series of test procedures before actually put into service for the purpose of checking whether the information platform can operate normally. For example, before a blade server is put into service, it is a customary practice to perform a Bonnie test procedure on the blade server to check whether the hard disk drive system on the blade server can operate normally when being linked to a network system.

One problem of conducting a Bonnie test procedure on a blade server, however, is that different units of blade servers could be installed with different kinds of operating systems, such as Red Hat 7.3, Red Hat 8.0, Red Hat 9.0, SuSE SLES 7, United Linux 1.0, Red Hat As 2.1, and Red Hat ES 2.1, to name just a few; and when the Bonnie test procedure is conducted under a different operating system, it typically requires a preliminary setup procedure to configure the operating system for a test environment that allows the test procedure to be capable of running under that operating system.

Presently, a conventional setup method to provide a suitable test environment under a specific operating system is done manually by the test engineer to enter a set of parameters that are specific to each particular test procedure. One drawback to this practice, however, is that the manual setup procedure is quite complex and thus laborious and time-consuming. Moreover, the manually-entered settings are prone to error, which would make the test procedure unable to be conducted. For example, if the test engineer wants to perform a Bonnie test procedure to test the hard disk drive system on a 20-piece blade server, then the test engineer needs first to multiple the value of the memory capacity in the blade server by 2.5 (if the result is greater than 2 GB (gigabyte), then it is rounded to 2 GB); and the result is then used as a parameter to be entered manually into the operating system for the setup of a suitable test environment for the Bonnie test procedure. Furthermore, the test engineer needs to load some executable files and data files into specific directories of the operating system on the blade server to allow the Bonnie test procedure to be executable under the operating system. This setup procedure requires averagely 5 to 10 minutes to finish the test procedure on each piece of server module circuit board, i.e., it requires a total of 100 to 200 minutes to finish the overall test procedure on the 20-piece blade server. This length of time is considered overly long and therefore the overall test procedure is quite time-consuming and thus inefficient. Moreover, the manually-entered settings are prone to error, which would make the test procedure unable to be executed under the operating system.

SUMMARY OF THE INVENTION

It is therefore an objective of this invention to provide a cross-platform test environment automatic setup method and system which allows the same test procedure to have a cross-platform capability that allows the same test procedure to be conducted under different operating systems without requiring test engineers to perform a manual setup procedure.

The cross-platform test environment automatic setup method and system according to the invention is designed for use on an information platform, such as a blade server, a 1U (single-unit) server, a network-linked workstation, a desktop computer, a notebook computer, a tablet computer, or the like, that is running on a particular kind of operating system, for the purpose of providing the information platform with a cross-platform test environment automatic setup capability that allows a particular test procedure to be capable of being conducted under the particular kind of operating system on the information platform.

The cross-platform test environment automatic setup method and system according to the invention is characterized by the use of a parameter database to prestore a number of sets of parameters respectively for a number of different test procedures for setup of a test environment within different kinds of operating systems, so that in actual use, the corresponding set of parameters can be retrieved based on user-specified test procedure and the particular kind of operating system on the information platform for configuring the operating system on the information platform based on the retrieved set of parameters for a test environment to run the user-selected test procedure on the information platform under the operating system.

Compared to prior art, this feature allows the same test procedure to have a cross-platform capability that allows the same test procedure to be conducted under different operating systems without requiring test engineers to manually configure the required test environment in different operating systems.

BRIEF DESCRIPTION OF DRAWINGS

The invention can be more fully understood by reading the following detailed description of the preferred embodiments, with reference made to the accompanying drawings, wherein:

FIG. 2 is a schematic diagram showing an example of the data structure of a parameter database utilized by the cross-platform test environment automatic setup method and system according to the invention.

DETAILED DESCRIPTION OF PREFERRED EMBODIMENTS

Figure 1:
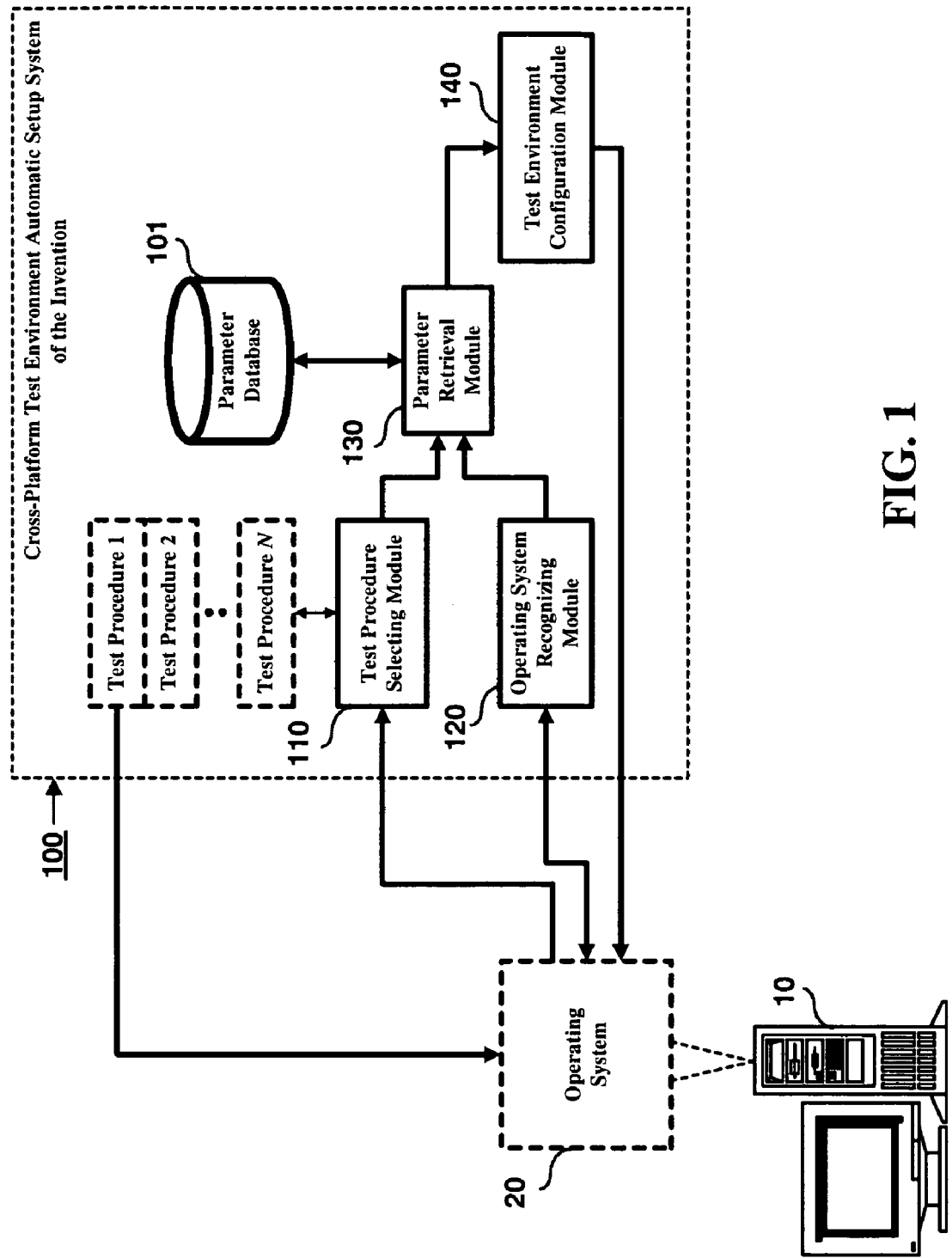
FIG. 1 is a schematic diagram showing the application architecture and object-oriented component model of the cross-platform test environment automatic setup system according to the invention.

The cross-platform test environment automatic setup method and system according to the invention is disclosed in full details by way of preferred embodiments in the following with reference to the accompanying drawings.

FIG. 1 is a schematic diagram showing the application architecture and object-oriented component model of the cross-platform test environment automatic setup system according to the invention (as the part enclosed in the dotted box indicated by the reference numeral 100). As shown, the cross-platform test environment automatic setup system of the invention 100 is designed for use on an information platform 10, such as a blade server, a 1U (single-unit) server, a network-linked workstation, a desktop computer, a notebook computer, a tablet computer, or the like, that is running on a particular kind of operating system 20, such as Red Hat 7.3, Red Hat 8.0, Red Hat 9.0, SuSE SLES 7, United Linux 1.0, Red Hat As 2.1, or Red Hat ES 2.1, to name just a few, for the purpose of providing the information platform 10 with a cross-platform test environment automatic setup capability that allows a particular test procedure, such a Bonnie test for the hard disk drive system on blade server, to be capable of being conducted under the particular kind of operating system 20 running on the information platform 10.

The object-oriented component model of the cross-platform test environment automatic setup system of the invention 100 comprises: (a) a parameter database 101; (b) a test procedure selecting module 110; (c) an operating system recognizing module 120; (d) a parameter retrieval module 130; and (e) a test environment configuration module 140.

The parameter database 101 is used to prestore a number of sets of parameters, each set of parameter being specific to a particular test procedures for running under a specific operating system. For example, if the information platform 10 is a blade server, then all of the required test procedures on the information platform 10 include, for example, a Bonnie test procedure, a Brest test procedure, an ESV test procedure, a CPU Kill test procedure, a fozone test procedure, a Type test procedure, a Bounce test procedure, and so on; and when each of these test procedures is to be conducted under different operating systems, such as Red Hat 7.3, Red Hat 8.0, Red Hat 9.0, SuSE SLES 7, United Linux 1.0, Red Hat As 2.1, or Red Hat ES 2.1, each test procedure will require a different set of parameters for a particular operating system. For this sake, as illustrated in FIG. 2, the parameter database 101 is used to prestore all sets of parameters required respectively by these test procedures (in FIG. 2, only 2 test procedures are shown) for all the possible operating systems that can be installed on the information platform 10.

The test procedure selecting module 110 is a user-operated input module that allows the user to specify a desired test procedure, for example by selecting from a group of test procedures. In the case of the information platform 10 being a blade server, for example, all of the required test procedures include a Bonnie test procedure, a Brest test procedure, an ESV test procedure, a CPU Kill test procedure, a fozone test procedure, a Type test procedure, and a Bounce test procedure, and from which the user can select the desired one by using this test procedure selecting module 110.

The operating system recognizing module 120 is capable of recognizing the particular kind of the operating system 20 currently installed on the information platform 10, i.e., the name and version of the operating system 20. For example, in the case of the operating system 20 running on the information platform 10 is Red Hat 7.3, the operating system 20 will generate an output attribute value [Red Hat 7.3]. In practical implementation, since different types of Linux operating systems have different directory structures and inherent system attributes, the operating system recognizing module 120 can check the directory structure and system attributes of the operating system 20 to determine its kind.

The parameter retrieval module 130 is capable of retrieving a corresponding set of parameters from the parameter database 101 based on which test procedure is selected by the user by means of the test procedure selecting module 110 and the kind of the operating system 20 detected by the operating system recognizing module 120. For example, in the case that the operating system 20 is [Red Hat 7.3] and the user-selected test procedure is [Test Procedure 1] (which is for example a Bonnie test procedure), then the parameter retrieval module 130 will use these two pieces of information as keywords to retrieve the corresponding set of parameters from the parameter database 101.

The test environment configuration module 140 is capable of using the retrieved set of parameters by the parameter retrieval module 130 from the parameter database 101 to configure the operating system 20 for a suitable test environment to run the user-selected test procedure on the information platform 10 under the operating system 20.

Referring together to FIG. 1 and FIG. 2, when a test engineer wants to initiate a test procedure on the information platform 10, he/she needs first to activate the cross-platform test environment automatic setup system of the invention 100, and then use the test procedure selecting module 110 to select the desired test procedure. Subsequently, the operating system recognizing module 120 will be automatically activated to check the name and version of the operating system 20 currently running on the information platform 10 to thereby obtain an attribute value indicative of the kind of the operating system 20, and then transfer this attribute value to the parameter retrieval module 130 which will responsively retrieves a corresponding set of parameters from the parameter database 101 based on which test procedure is selected by the user by means of the test procedure selecting module 110 and the kind of the operating system 20 currently running on the information platform 10. The test environment configuration module 140 then uses the retrieved set of parameters by the parameter retrieval module 130 from the parameter database 101 to configure the operating system 20 for a suitable test environment to run the user-selected test procedure on the information platform 10 under the operating system 20.

The cross-platform test environment automatic setup system of the invention 100 is more advantageous to use than prior art particularly in that it allows the test environment setup procedure to be automatically performed without human intervention, which allows the testing to be more easily and quickly and thus more efficiently than prior art. Moreover, it allows the test environment to be always correctly set without having error due to human factor. For example, by the prior art, a Bonnie test procedure on a 20-piece blade server would require 5 to 10 minutes to finish the test procedure on each piece of server module circuit board, i.e., it requires a total of 100 to 200 minutes to finish the overall test procedure on the 20-piece blade server. By contrast, by the invention, a Bonnie test procedure on the same 20-piece blade server requires only one minute to finish the test procedure on each piece of server module circuit board, and therefore, it requires a total of only 20 minutes to finish the overall test procedure on the 20-piece blade server. The advantage of the invention over the prior art is therefore apparent.

In conclusion, the invention provides a cross-platform test environment automatic setup method and system which is designed for use on an information platform that is running on a particular kind of operating system, for the purpose of providing the information platform with a cross-platform test environment automatic setup capability that allows a particular test procedure to be capable of being conducted under the operating system on the information platform; and which is characterized by the use of a parameter database to prestore a number of sets of parameters respectively for a number of different test procedures for setup of a test environment within different kinds of operating systems, so that in actual use, the corresponding set of parameters can be retrieved based on user-specified test procedure and the particular kind of operating system on the information platform for configuring the operating system on the information platform based on the retrieved set of parameters for a test environment to run the user-selected test procedure on the information platform under the operating system. Compared to prior art, this feature allows the same test procedure to have a cross-platform capability that allows the same test procedure to be conducted under different operating systems without requiring test engineers to manually configure the required test environment in different operating systems. The invention is therefore more advantageous to use than the prior art.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A cross-platform test environment automatic setup method for use on an information platform that is running on a particular kind of operating system, for the purpose of providing the information platform with a cross-platform test environment automatic setup capability to allow a particular test procedure to be capable of being conducted under the operating system on the information platform; the cross-platform test environment automatic setup method comprising: building a parameter database which prestores a number of sets of parameters respectively for a number of different test procedures for setup of a test environment within different kinds of operating systems; performing a test procedure selecting procedure for user-operated selection of a desired test procedure from a group of test procedures; detecting the particular kind of the operating system currently installed on the information platform; retrieving a corresponding set of parameters from the parameter database based on the user-selected test procedure and the detected kind of operating system on the information platform; and configuring the operating system on the information platform based on the retrieved set of parameters for a test environment to run the user-selected test procedure on the information platform under the operating system.

2. The cross-platform test environment automatic setup method of claim 1, wherein the information platform is a blade server.

3. The cross-platform test environment automatic setup method of claim 1, wherein the information platform is a 1U (single-unit) server.

4. The cross-platform test environment automatic setup method of claim 1, wherein the information platform is a network-linked workstation.

5. The cross-platform test environment automatic setup method of claim 1, wherein the information platform is a desktop computer.

6. The cross-platform test environment automatic setup method of claim 1, wherein the information platform is a notebook computer.

7. The cross-platform test environment automatic setup method of claim 1, wherein the information platform is a tablet computer.

8. A cross-platform test environment automatic setup system for use on an information platform that is running on a particular kind of operating system, for the purpose of providing the information platform with a cross-platform test environment automatic setup capability to allow a particular test procedure to be conducted under the operating system on the information platform; the cross-platform test environment automatic setup system comprising: a parameter database, which prestores a number of sets of parameters respectively for a number of different test procedures for setup of a test environment within different kinds of operating systems; a test procedure selecting module, which is a user-operated input module that allows user-operated selection of a desired test procedure from a group of test procedures; an operating system recognizing module, which recognizes the particular kind of the operating system currently installed on the information platform; a parameter retrieval module, which retrieves a corresponding set of parameters from the parameter database based on the user-selected test procedure via the test procedure selecting module and the particular kind of operating system on the information platform detected by the operating system recognizing module; and a test environment configuration module, which configures the operating system on the information platform based on the retrieved set of parameters for a test environment to run the user-selected test procedure on the information platform under the operating system.

9. The cross-platform test environment automatic setup system of claim 8, wherein the information platform is a blade server.

10. The cross-platform test environment automatic setup system of claim 8, wherein the information platform is a 1U (single-unit) server.

11. The cross-platform test environment automatic setup system of claim 8, wherein the information platform is a network-linked workstation.

12. The cross-platform test environment automatic setup system of claim 8, wherein the information platform is a desktop computer.

13. The cross-platform test environment automatic setup system of claim 8, wherein the information platform is a notebook computer.

14. The cross-platform test environment automatic setup system of claim 8, wherein the information platform is a tablet computer.

* * * * *